United States Patent
Sayah

(10) Patent No.: US 10,281,994 B2
(45) Date of Patent: May 7, 2019

(54) SMART WAND DEVICE

(71) Applicant: Anousheh Sayah, McLean, VA (US)

(72) Inventor: Anousheh Sayah, McLean, VA (US)

( * ) Notice: Subject to any disclaimer, the term of this patent is extended or adjusted under 35 U.S.C. 154(b) by 22 days.

(21) Appl. No.: 15/625,511

(22) Filed: Jun. 16, 2017

(65) Prior Publication Data

US 2018/0364813 A1 Dec. 20, 2018

(51) Int. Cl.
| | |
|---|---|
| *G06F 3/0346* | (2013.01) |
| *H04L 29/06* | (2006.01) |
| *G06T 11/20* | (2006.01) |
| *G06F 3/01* | (2006.01) |
| *G06F 3/0354* | (2013.01) |
| *G06F 1/16* | (2006.01) |
| *H04W 12/06* | (2009.01) |
| *G06N 99/00* | (2010.01) |
| *H04M 1/725* | (2006.01) |
| *G06K 9/00* | (2006.01) |
| *G06F 3/03* | (2006.01) |

(52) U.S. Cl.
CPC .......... *G06F 3/0346* (2013.01); *G06F 1/1694* (2013.01); *G06F 3/017* (2013.01); *G06F 3/0304* (2013.01); *G06F 3/03545* (2013.01); *G06K 9/00006* (2013.01); *G06N 99/005* (2013.01); *G06T 11/203* (2013.01); *H04L 63/083* (2013.01); *H04L 63/0853* (2013.01); *H04L 63/0861* (2013.01); *H04M 1/7253* (2013.01); *H04W 12/06* (2013.01)

(58) Field of Classification Search
USPC ........................................................ 345/179
See application file for complete search history.

(56) References Cited

U.S. PATENT DOCUMENTS

| | | | | |
|---|---|---|---|---|
| 6,161,005 | A * | 12/2000 | Pinzon | G07C 9/00182 340/5.2 |
| 7,106,171 | B1 * | 9/2006 | Burgess | B60R 25/23 340/10.42 |
| 2010/0013860 | A1 * | 1/2010 | Mandella | G01B 21/04 345/650 |
| 2012/0268360 | A1 * | 10/2012 | Mikhailov | A63F 13/73 345/156 |
| 2012/0270653 | A1 * | 10/2012 | Kareemi | A63F 13/52 463/33 |

(Continued)

*Primary Examiner* — Chineyere D Wills-Burns
(74) *Attorney, Agent, or Firm* — The Marbury Law Group, PLLC; Benjamin B. Mazahery

(57) ABSTRACT

A smart wand device for unlocking and controlling a remote computing device (e.g., mobile device, phone, tablet, etc.) includes an elongated barrel housing, a position sensor, an activation button, a transceiver, and a processor. The activation button is positioned midway along the elongate barrel housing such that, while the user is holding the elongate barrel housing in a writing position, the user's fingerprint features are detected and used to unlock the remote computing device. The smart wand device also collects sensor data corresponding to a gesture made by the user, uses a forty-five degree angle between the horizontally extending longitudinal axis and the vertically extending longitudinal axis to determine the sensor data not to be used for a two-dimensional rendering, and transmits the sensor data to the remote computing device for conversion into a two-dimensional rendering corresponding to a gesture made by the user.

14 Claims, 7 Drawing Sheets

(56) References Cited

U.S. PATENT DOCUMENTS

| | | | |
|---|---|---|---|
| 2013/0218516 A1* | 8/2013 | Yu | G06F 3/046 702/150 |
| 2014/0068007 A1* | 3/2014 | O'Gorman | H04N 7/147 709/219 |
| 2015/0124086 A1* | 5/2015 | Melle | G01B 11/002 348/136 |
| 2015/0205384 A1* | 7/2015 | Osterhout | G06F 3/038 345/158 |
| 2015/0242002 A1* | 8/2015 | Altman | G06F 3/017 345/173 |
| 2015/0358315 A1* | 12/2015 | Cronin | H04L 63/0861 726/6 |
| 2016/0139691 A1* | 5/2016 | Li | G06F 3/03545 345/179 |

* cited by examiner

SMART WAND DEVICE

BACKGROUND

Note taking has evolved from using writing instruments on a surface, like pen and paper, to modern computing devices that receive and communicate numerous kinds of data electronically. Smart phones and tablet computers are powerful mobile computing devices that have enabled many new kinds of note taking and communications, but generally require direct interaction with a touch-screen or buttons on the device. Even the act of unlocking mobile computing devices requires direct physical interactions, such as entering a password or using a fingerprint scanner on the device. Such direct physical interactions can be inconvenient, particularly when the mobile computing device is not readily accessible (e.g., out of reach or stored in a bag or pocket).

Electronic writing instruments, like smart pens, do allow a user to write on a surface in a traditional manner, while recording the surface interactions on a connected computing device. However, such electronic writing instruments generally require a special writing surface and/or are not able to unlock the smart phone. It would be desirable to have a small accessory that could be used to unlock, activate, enter notations into, and even interact with the mobile computing device without the need for a special writing surface.

SUMMARY

In some embodiments, methods, devices, and systems may collect data with a smart wand device held in a user's hand. The smart wand device includes an elongate barrel housing, a position sensor, a transceiver, and a processor. The elongate barrel housing may extend between a tip and an end cap of the smart wand device. A portion of the elongate barrel housing may be sized to be held by a user. The position sensor may be secured to the elongate barrel housing and configured to determine changes in position of a reference point of the smart wand device. The processor may be disposed within the elongate barrel housing and coupled to at least the position sensor and the transceiver. The processor may be configured with processor-executable instructions to perform operations including receiving sensor data from the position sensor. The sensor data may measure movements of a gesture made with the tip in midair by the user holding the elongate barrel housing. The gesture may be made without contact between the tip and a surface. The sensor data may be transmitted, using the transceiver, to a remote computing device for conversion into a two-dimensional rendering corresponding to the gesture made with the tip in midair by the user.

Various embodiments may include a fingerprint scanner disposed on an outer portion of the elongate barrel housing and coupled to the processor. The fingerprint scanner may be configured to detect fingerprint features of the user in response to the user engaging a finger on the fingerprint scanner while the user is holding the elongate barrel. The processor may be configured with processor-executable instructions to receive data representing the fingerprint features. The processor may also transmit the data representing the fingerprint features, using the transceiver, to the remote computing device. In addition, the processor may receive an indication from the remote computing device that the data representing the fingerprint features was accepted for unlocking the remote computing device. The reference point used to determine changes in position may correspond to a nib of the smart wand device.

Various embodiments may include an orientation sensor secured to the elongate barrel housing and configured to determine changes in an orientation of the elongate barrel.

Some embodiments may include a method of collecting data with a smart wand held in a user's hand. The method may include receiving sensor data measuring a gesture made with the smart wand in midair by the user's hand. The gesture may be made without contact between the smart wand and a surface other than the user's hand. The method may also include transmitting the sensor data to a remote computing device for generating a two-dimensional rendering corresponding to the gesture made with the smart wand in midair by the user's hand. The two-dimensional rendering may include at least one drawn line or mark that matches a pattern of the gesture. The gesture may include shorthand used for the conversion into the two-dimensional rendering. The two-dimensional rendering may include at least one alphanumeric character. The conversion into the two-dimensional rendering may use a previous training sequence that correlates the gesture to the two-dimensional rendering.

In various embodiments, the method may include converting the sensor data to rendering data configured to generate a visual representation of the gesture made with the smart wand on a display of a remote computing device. The sensor data being transmitted to the remote computing device may include the rendering data from the conversion. The method may include receiving an authorization input corresponding to the user contacting a first button on the smart wand. Also an unlock activation message may be transmitted to the remote computing device in response to receiving the authorization input. The unlock activation message may include the authorization input for unlocking the computing device from a locked state. Reception by the remote computing device of the unlock activation message may not require line-of-sight between the smart wand and the remote computing device.

In various embodiments, the first button may include a fingerprint sensor and the authentication input may include fingerprint data collected by the fingerprint sensor on the smart wand. The authentication input may include a sequence of button presses with a particular timing sequence that acts as an authentication code for unlocking the computing device from the locked state. The method may include receiving an application launch input corresponding to the user contacting an application launch button on the smart wand. Also, an application activation message may be transmitted to the remote computing device in response to receiving the application launch input. The application activation message may act to activate an application on the remote computing device. The application activated by the application activation message may receive an audio input from a microphone of the remote computing device. The application activated by the application activation message may receive a video input from a camera of the remote computing device.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION

Various embodiments will be described in detail with reference to the accompanying drawings. Wherever possible the same reference numbers will be used throughout the drawings to refer to the same or like parts. References made to particular examples and implementations are for illustrative purposes, and are not intended to limit the scope of the invention or the claims.

Figure 1A:
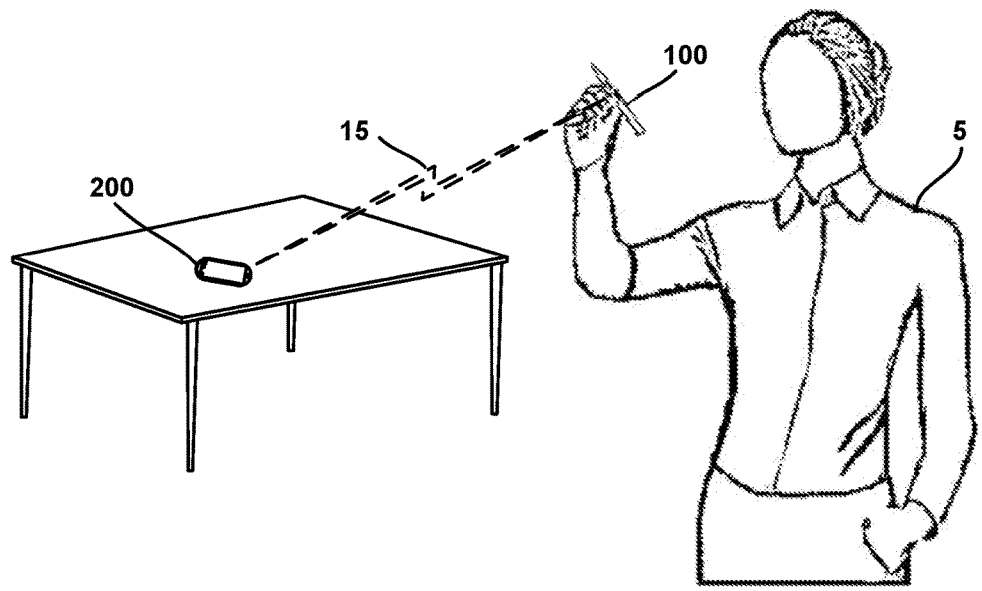
FIG. 1A is a schematic representation of a user using a smart wand device linked to a remote computing device according to various embodiments.

FIG. 1A illustrates a user 5 using a smart wand device 100 in accordance with various embodiments. The smart wand device 100 works in conjunction with a remote computing device 200, via a direct wireless link 15, to activate, unlock, enter notations into, and/or interact with the remote computing device 200 without the need for a special writing surface. Gestures made by the user 5 with the smart wand device 100 may be converted into two-dimensional renderings that may be displayed and used by the remote computing device 200. The two-dimensional renderings may correspond to written words, drawings, or other notations, like those typically done using a pen, pencil, or other writing instrument on a writing surface. The smart wand device 100 detects gestures using onboard sensors that measure movement and/or orientation of the smart wand device 100 in midair. Using the direct wireless link 15, the smart wand device 100 may communicate the measured movement to the remote computing device 200. The remote computing device 200, which may be a smart phone or other computing device, may display and save the measured movements as two-dimensional renderings, corresponding to text, drawings, notations, or the like. In some embodiments, one or more of the two-dimensional renderings may be information structures that store information suitable for storing, analyzing, processing, and/or rendering the measured movements. In some embodiments, the smart wand device 100 may be configured so as to allow the user 5 to activate or unlock the remote computing device 200 by transmitting a pass code, personal identification number (PIN), a username and password combination, a biometric such as a fingerprint scan, and/or other access keys via the direct wireless link 15.

Figure 1B:
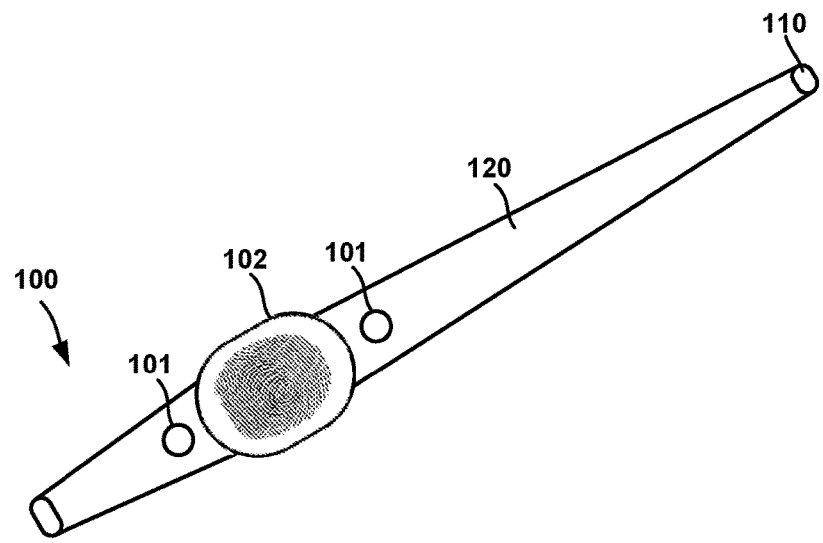
FIG. 1B is a component block diagram illustrating a smart wand device according to various embodiments.

FIG. 1B illustrates a functional block diagram of an example smart wand device 100 suitable for implementing various embodiments. With reference to FIGS. 1A and 1B, the smart wand device 100 may be sized and shaped to look and feel like a traditional writing instrument or a wand. In the example illustrated in FIG. 1B, the smart wand device 100 is shaped similar to a wand. The smart wand device 100 may include a nib 110 disposed at the tip of one end of an elongate barrel housing 120, and a plurality user interface elements 101, such as input buttons, keys, etc. The smart wand device 100 may also include a biometric sensor 102, such a finger print reader configured to collect a fingerprint scan from the user. The smart wand device 100 may further include various hardware and/or software components suitable for collecting and processing sensor data from sensors, including speakers, sensors for monitoring physical conditions (e.g., location, direction, motion, orientation, vibration, pressure, etc.), cameras, compasses, GPS receivers, communications circuitry (e.g., Bluetooth®, WLAN, WiFi, etc.), and other well-known components (e.g., accelerometer, gyroscope, etc.) of modern electronic devices.

Figure 2:
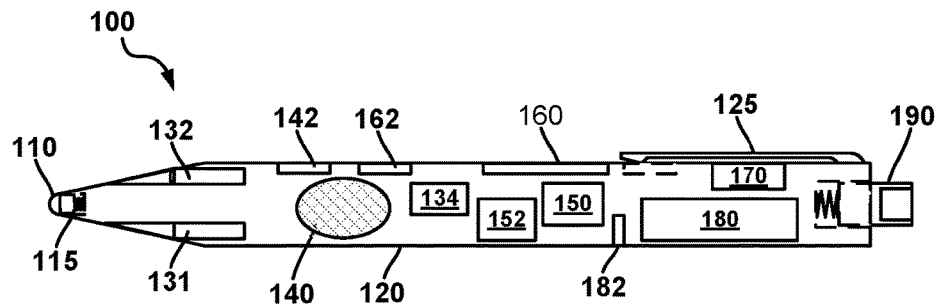
FIG. 2 is a component block diagram illustrating a smart wand device according to various embodiments.

In the example illustrated in FIG. 2, the smart wand device 100 is shaped similar to conventional ink-based pen. The smart wand device 100 may include a nib 110, disposed at the tip of one end of an elongate barrel housing 120. The smart wand device 100 does not necessarily have an ink or lead-based dispensing tip and thus the nib 110 may identify to a user 5, which end of the smart wand device 100 is used as a virtual writing tip. In addition, the smart wand device 100 may optionally include a pen-style clip 125 toward the other end, opposite the nib 110. In addition to the functional benefits provided by traditional pen-style clips (e.g., used for securing the smart wand device 100 to a pocket or sheet of material), the pen-style clip 125 may provide a visual clue to the user 5 as to which end is not used as the virtual writing tip. In addition, the pen-style clip 125 may optionally function as a user input button. An outer surface of the elongate barrel housing 120 may be shaped or formed of materials that provide ergonomic enhancements, like a comfortable or secure grip, or stylistic elements.

The nib 110 of the smart wand device 100 may be retractable into a recess within the elongate barrel housing 120. Retracting the nib 110 may protect delicate or sensitive components or materials forming the nib 110. For example, the nib 110 may include one or more sensors (e.g., a position or force sensor). In addition, the nib 110 may include a capacitive touch material for using the smart wand device 100 as a stylus. Retracting the nib 110 may generate an off signal, registered by the processor 150, and corresponding to the smart wand device 100 being in a non-rendering mode or a power-saving state. In contrast, deploying the nib 110 may generate an on signal, registered by the processor 150, and corresponding to the smart wand device 100 being in an active rendering mode. The user may actuate a retraction mechanism 115 using a retraction button 190 at the other end of the smart wand device 100. Optionally, a force sensor may be incorporated into the nib 410 for measuring a force exerted thereon, which may allow the nib 410 to operate as another input button.

In accordance with various embodiments, the smart wand device 100 may have one or more position sensors configured to measure indicators of an actual and/or relative position of the smart wand device 100. The position sensor(s) may measure movements made by the user 5 with the smart wand device 100 in midair, without contact between the smart wand device 100 and a surface other than the user's hand (i.e., the hand holding the smart wand device 100). The movements measured by the position sensor(s) represent one or more gestures made by the user 5 with the smart wand device 100.

The position sensors may include an optical sensor 131 with a lens for imaging the three-dimensional environment and a photo-detector for sensing light passing through the lens. For example, the photo-detector may be a pixel array sensor, e.g., a CMOS, a CCD or a PIN-diode sensor. Optionally, the optical sensor 131 may work in conjunction with a light projector 132 that emits a certain light into the real three-dimensional environment. The optical sensor 131 may receive a scattered portion of the light from light projector 132 to infer an absolute position in three-dimensional space of the smart wand device 100. The optical sensor 131 may determine a centroid of light flux from the light projector 132. In addition, to avoid ambient illumination interference, the light projector 132 may use a number of infrared emitting diodes or infrared light-emitting diodes (LEDs). The infrared LEDs may be modulated in a certain pattern to further improve their signal-to-noise performance and render them better distinguishable. The optical sensor 131 may include more than one such sensor arranged in various locations along the length of the elongate barrel housing 120 to ensure orientations and positions of the smart wand device 100 may be determined. For example, the optical sensor 131 may be disposed near the nib 110 in order to detect light in the same direction the nib 110 faces. Similarly, the light projector 132 may have a complementary position to the optical sensor 131, such as an opposite side laterally of the smart wand device 100.

In addition, the smart wand device 100 may include a motion sensor 134, such as a gyroscope or an accelerometer. The motion sensor 134 may include an optical flow-measuring unit. Alternatively or additionally, the motion sensor 134 may include magnetic field measuring units or acoustic field measuring units that may interpolate or refine an absolute or inferred position measured by the optical sensor 131. During normal operation (i.e., an active rendering mode), the smart wand device 100 may sample the encoding from the motion sensor 134 as the nib 110 moves in the air. The sampled encoding may be decoded by the processor 150 to identify the absolute position of the nib 110 and the smart wand device 100 generally.

In accordance with various embodiments, the smart wand device 100 may include one or more user interface input mechanisms, such as an activation button 140 and a function-select button 142. Alternatively, once a user turns on or activates the smart wand device 100, applying pressure to one or more discrete elements, like the nib 110 or the pen-style clip 125, may activate functions or operate as function selector or input button.

The activation button 140 may be disposed at an intermediate position along the elongate barrel housing 120. Preferably, the activation button 140 is ergonomically positioned along the elongate barrel housing 120, such that while the user is holding the smart wand device 100 with a select hand, a finger on that hand is comfortably and conveniently received on the activation button 140. In this way, while holding the smart wand device 100, the user may selectively engage and disengage the activation button without letting go of the smart wand device 100 or having to use the other hand.

In various embodiments, the activation button 140 is a fingerprint scanner configured to capture fingerprint features, when a user's finger is placed on or over a surface of the activation button 140. Thus, part of the ergonomic positioning of the activation button 140 may include configuring the activation button at an angle and position that consistently captures the user's fingerprint while the user holds normally the smart wand device 100. The activation button 140 may employ one or more of various technologies, including optical, capacitive, RF, thermal, piezoresistive, ultrasonic, and/or piezoelectric. For example, Touch ID technologies used on iPhones, such as a capacitive touch sensor configured to detect the user's fingerprint or features thereof, may be included in the activation button 140.

The captured fingerprint features may be digitally processed by the processor 150 of the smart wand device 100 to create a biometric template (a collection of extracted features) which may be stored in memory and used for matching. In this way, the biometric template may be compared to a current user's presently scanned fingerprint features to determine whether it is a match. Without a proper match, the current user may be prohibited from using all or certain functions of the smart wand device 100.

Alternatively, such as for security reasons, the captured fingerprint features may be stored onboard the smart wand device only long enough to communicate the features to a remote computing device. The remote computing device may have stronger security and/or the user may feel more comfortable with such personal and important biometric data being stored in only one place, like the user's smart phone. Thus, the remote computing device may create or already have stored the biometric template, which may be used for later matching. In this way, the currently captured fingerprint features may be promptly transmitted to the remote computing device and wiped from an onboard memory, as a security feature. Thereafter, the remote computing device may determine whether the data it received, representing the fingerprint features, matches a stored biometric template used as an access key for the remote computing device and/or a particular program or application thereon. In response to a processor of the remote computing device determining that the data it received, representing the fingerprint features, matches the stored biometric template, that processor may unlock the remote computing device and/or transmit an indication to the smart wand device that the data representing the fingerprint features were accepted for unlocking the remote computing device.

The smart wand device 100 may be powered by a rechargeable battery 180, which may be charged from a dedicated pen cradle or from a USB charger configured to be plugged into a charging port 182. The smart wand device 100 may additionally include a display 160 and/or one or more LED indicators 162.

The smart wand device 100 may include one or more processor(s) 150 coupled to the other electronic components of the smart wand device 100, such as the optical sensor 131, optional light projector 132, motion sensor 134, activation button 140, function-select button 142, display 160, LED indicator(s) 162, rechargeable battery 180, and the charging port 182 if configured to communicate data (e.g., a USB port). The processor(s) 150 may be configured with processor-executable instructions to receive inputs from the position sensor(s), as well as generate outputs for the display 160, the LED indicator(s) 162, or other output elements. The position sensors, such as the optical sensor 131 and/or the motion sensor 134 may be used as means for receiving signals and/or indications of a position and/or movement. The processor(s) may be used as means for performing functions or determining conditions/triggers, such as whether patterns match or as means for identifying gestures, a reference input or determining a frame of reference. In addition, the display 160 or a speaker may be used as means for outputting. The processor may be coupled to one or more internal memories 152. Internal memories 152 may be volatile or non-volatile memories, which may be secure and/or encrypted memories, or unsecure and/or unencrypted memories, or any combination thereof. The processor 150 may be any programmable microprocessor, microcomputer or multiple processor chip or chips that can be configured by software instructions (i.e., applications) to perform a variety of functions, including the functions of various aspects described above. Multiple processors may be provided, such as one processor dedicated to one or more functions and another one or more processors dedicated to running other applications/functions. Typically, software applications may be stored in the internal memory 152 before they are accessed and loaded into the processor. The processor 150 may include internal memory 152 sufficient to store the application software instructions. In many devices, the internal memory 152 may be a volatile or nonvolatile memory, such as flash memory, or a mixture of both. For the purposes of this description, a general reference to memory refers to memory accessible by the processor including internal memory or removable memory plugged into the hearing aid and memory within the processor.

The processor 150 may be coupled to a transceiver 170, within the elongate barrel housing 120, for communicating with the remote computing device (e.g., 200). The transceiver 170 may use existing conductive elements, such as the pen-style clip 125, as an antenna or an extension of antenna resources of the smart wand device 100. The transceiver 170 may service as a dedicated RF resource chain for communications using technologies, such as Wi-Fi or Bluetooth. The transceiver 170 may include more than one transceiver for supporting separate technologies, such as one for Bluetooth and one for Wi-Fi. Alternatively, additional communication resources and associated transceivers may be provided and used for remote connections to remote computing device.

A processor 150 of the smart wand device 100 may initially receive a pair request entered by a user through an interface of the smart wand device 100. The pair request may cause the processor 150 to initiate a pairing routine with a nearby remote computing device. For example, the processor 150 may use the transceiver 170 to convey an external pairing signal to the remote computing device to establish a wireless communication link. In some embodiments, the pairing routine may alternatively or additionally establish a direct wireless link using a Wi-Fi data connection.

The smart wand device 100 may have various modes of operation, including an off mode, low-power mode, training mode, and an active rendering mode. Like many conventional electronic devices, the off mode may conserve maximum power and be used to reset the processor. A low-power mode may be provided to conserve as much power as possible without re-booting the processor (e.g., 150). For example, the low-power mode may deactivate sensors (e.g., 132, 134), the display (e.g., 160), and/or the transceiver (e.g., 170). The training mode may enable the processor to calibrate, learn, and translate user gestures into meaningful text or commands. The active rendering mode may correspond to when the sensors are actively measuring changes in position (i.e., gestures made with the smart wand device 100) and/or communicating the measured changes in position to a remote computing device.

In accordance with various embodiments, a user may be provided with one or more ways to make the smart wand device 100 enter, exit, or remain in the active rendering mode. For example, active engagement by the user with the activation button 140 may make the smart wand device 100 enter the active rendering mode, while disengagement therewith may make the smart wand device 100 exit the active rendering mode. Thus, continual engagement by the user with the activation button 140 maintains the smart wand device in the active rendering mode. Alternatively or additionally, a double-tap on the activation button 140 by the user may be used to either enter or exit the active rendering mode, without the need to continue holding the activation button 140 to maintain the active rendering mode. Also, an orientation of the smart wand device 100, detected by onboard sensors, may control whether the smart wand device 100 is in the active rendering mode. For example, as long as the user holds the smart wand device 100 horizontally, plus or minus forty-five degrees, a processor of the smart wand device may maintain the active rendering mode. In this way, once the processor determines that sensors have detected a tilting of the smart wand device 100 up or down beyond forty-five degrees, the processor may automatically exit the active rendering mode.

As part of the active rendering mode, the processor may use the transceiver to transmit sensor data, which measures and reflects the movements of a gesture, to the remote computing device via the direct wireless link for further processing. In this way, the remote computing device may translate the sensor data to text or function commands. In this way, a processor of the remote computing device or a web-based application may identify input characters, (e.g., alpha-numeric characters or symbols) based on the measured changes in position. Alternatively, during the active rendering mode, the processor of the smart wand device 100 may translate measured changes in position to text or function commands. In this way, the processor of the smart wand device 100 may identify input characters, (e.g., alpha-numeric characters or symbols) based on the measured changes in position. When the smart wand device 100 is paired and actively communicating with the remote computing device 200, the smart wand device 100 may transmit data in real time or as soon as all previously buffered data has been transmitted. In addition or alternatively, the processor of the smart wand device 100 may temporarily store the sensor data, such as when the direct wireless link is unavailable, until a later time when the direct wireless link becomes available.

In various embodiments, the smart wand device 100 may additionally include components such as a microphone and/or a camera for receiving and capturing (i.e., recording) audio and/or video inputs. The microphone and/or camera may be used to record memos, messages, and/or even to interact with a remote computing device. A user may interact with and/or activate an application on the remote computing device using an audio and/or video input received by the microphone and/or camera and transmitted to the remote computing device.

In various embodiment, the smart wand device may include one or more additional components, such as a speaker, scanner, laser pointer, thermometer, biometric sensors (e.g., for measuring pulse, blood pressure, etc.), and/or the like.

Figure 3A:
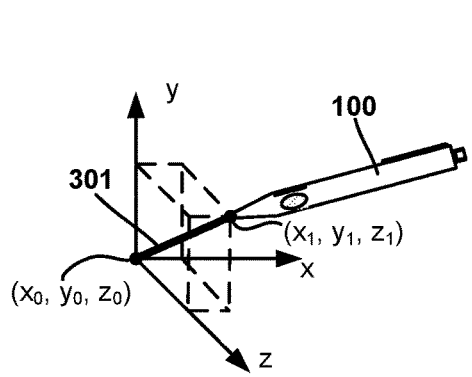
FIG. 3A is a schematic representation of a coordinate system used for measuring a gesture made with a smart wand device according to various embodiments.
Figure 3B:
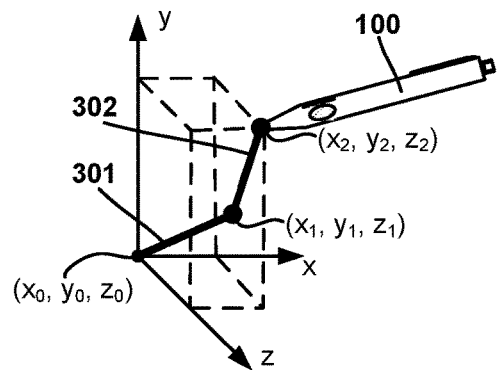
FIG. 3B is a schematic representation of the coordinate system of FIG. 3A used for measuring further elements of a gesture made with a smart wand device according to various embodiments.

FIGS. 3A and 3B illustrate the smart wand device 100 oriented in two different positions within a three-dimensional (3D) space, having a Cartesian coordinate system with x, y, and z-axes. When the smart wand device is in active rendering mode, the position sensor(s) (e.g., optical sensor 131 and/or motion sensor 134) may measure various aspects of the movement of the smart wand device 100 to determine a relative position. One aspect of the movement relates to relative changes in position of a reference point of the smart wand device 100. Those changes of position may correspond to one or more gestures made by the user 5 with the smart wand device 100 in midair. For ease of explanation and illustration, the nib (e.g., 110 in FIG. 2) of the smart wand device 100 may be used as the reference point for measuring the changes of position. Alternatively, other positions on or near the smart wand device 100 may be used as the reference point.

The smart wand device 100 may establish a reference position, from which movements and other positions are measured. For example, when the user initially places the smart wand device 100 in the active rendering mode (e.g., by pressing the activation button 140), an origin point ($x_0$, $y_0$, $z_0$) may be established. In this way, the position sensors measure changes of position relative to that origin point. In FIG. 3A, the nib of the smart wand device has been moved from the origin point ($x_0$, $y_0$, $z_0$) to a first reference point ($x_1$, $y_1$, $z_1$). The movement between the origin point ($x_0$, $y_0$, $z_0$) and the first reference point ($x_1$, $y_1$, $z_1$) define a first line 301, which may form all or part of a gesture. The processor may differentiate the first reference point ($x_1$, $y_1$, $z_1$) from other points along the first line 301 by a hesitation or pause in movement that has taken place at the first reference point ($x_1$, $y_1$, $z_1$). Alternatively, the processor may differentiate the first reference point ($x_1$, $y_1$, $z_1$) from prior reference points along the first line 301 or subsequent positions beyond the first line 301 by a smooth and/or continuous movement (i.e., no hesitation or sharp changes of direction). In FIG. 3B, the nib of the smart wand device has been moved from the first reference point ($x_1$, $y_1$, $z_1$) to a second reference point ($x_2$, $y_2$, $z_2$). The movement between the first reference point ($x_1$, $y_1$, $z_1$) and the second reference point ($x_2$, $y_2$, $z_2$) may define a second line 302, which together with the first line 301 may form all or part of a gesture.

For ease of explanation, multiple points (i.e., the origin, first reference point, and second reference point) within the 3D space in FIGS. 3A-3B are each denoted by a dot, larger than the corresponding lines between points. However, when converting the movement path to a 2D rendering in accordance with various embodiments, the points do not need to be larger (i.e., do not need to stand out) from the movement path lines. In addition, although both the first line 301 and the second line 302 are illustrated as straight lines, one or both of the first and second lines 301, 302 may include one or more curved portions or even have no straight portions.

In accordance with various embodiments, the user may designate the beginning and the end of a particular gesture by pressing and releasing the activation button (e.g., activation button 140 in FIG. 2). For example, while intending to make a gesture with the smart wand device, the user may press and hold the activation button with a thumb, similar to the way individuals hold their thumb against a traditional writing instrument when writing. The user may denote an end to one gesture by lifting the thumb from the activation button, while still holding other portions of the smart wand device with other fingers and portions of the same hand. In this way, the user may press and hold the activation button with the thumb while moving the smart wand device through the air to follow a pattern representing a particular character or word. Once the pattern is complete, the user may release the activation button to denote as much. The user may then continue with another character or word by once again pressing and holding the activation button while making further movements associated with the same or other pattern.

Figure 4:
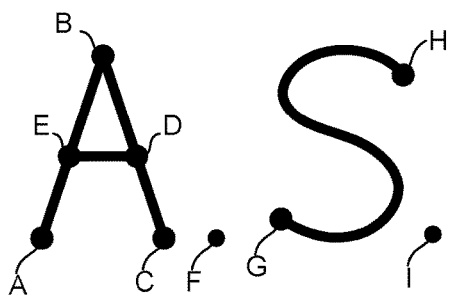
FIG. 4 is a two-dimensional rendering of gestures made with a smart wand device according to various embodiments.

FIG. 4 illustrates an example of a 2D rendering of multiple gestures measured during intervals in which the smart wand device is in the active rendering mode, separated by intervals in which the smart wand device is not in the active rendering mode. For example, continued pressing of the activation button may maintain the active rendering mode, while intervals in which the user released the activation button may exit the active rendering mode. Alternatively, continually maintaining the smart wand device in a horizontal configuration, plus or minus forty-five degrees, may maintain the active rendering mode, while intervals in which the user tilts the smart wand device more than forty-five degrees from horizontal may exit the active rendering mode. The reference points in FIG. 4 are emphasized as dots larger than the connection lines, similar to FIGS. 3A-3B, for ease of explanation.

The 2D rendering illustrated in FIG. 4 may represent a conversion of user movements in which the user may have starting pressing and holding the activation button when the nib of the smart wand device was at position A. Thereafter, while continuing to hold the activation button, the user moved the nib of the smart wand device to position B, followed by positions C, D, and E, in that order. Once arriving at position E, the user let go of the activation button then moved to position F, where the user briefly pressed the activation button without further movement. After letting go of the activation button while still at position F, the user moved the nib to position G and re-engaged the activation button. From position G, the user continued to hold the activation button and moved in a serpentine pattern to position H, where the user once again let go of the activation button. Finally, after arriving at position H, the user let go of the activation button then moved to position I, where the user briefly pressed the activation button without further movement, then let go. In this way, the user will have made four separate gestures that form the letters "A" and "S," each followed by a period, as shown in FIG. 4. Alternatively, the above step of pressing and holding the activation button, for entering and maintaining the active rendering mode, may be substituted with maintaining the smart wand device in a horizontal orientation, plus or minus forty-five degrees. Similarly, the above step of letting go of the activation button, for exiting the active rendering mode, may be substituted with tilting the smart wand device more than forty-five degree from the horizontal orientation.

Although the user may intend to form a 2D rendering, the user's hand may move the smart wand device (e.g., 100) unintentionally in more than two dimensions. This may occur because without a conventional writing surface, it may be difficult for a user to limit movements of the smart wand device to only two dimensions. The user's hand attempting to form characters in midair is not constrained to follow the plane of a conventional 2D writing surface. Thus, in accordance with various embodiments, one dimension of movement may be ignored or used differently than the other two dimensions of movement, which other two dimensions may be used for conversion into the 2D rendering.

Figure 5:
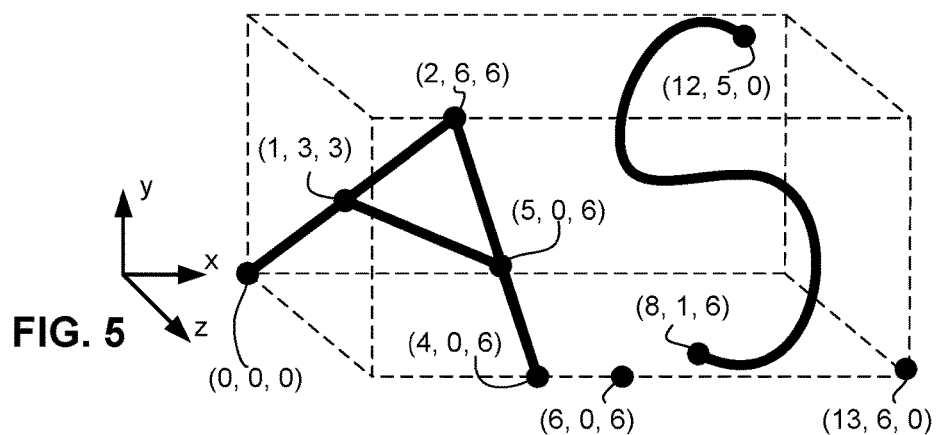
FIG. 5 is a three-dimensional rendering of gestures made with a smart wand device according to various embodiments.

FIG. 5 illustrates an example of a 3D movement path that may be converted into a 2D rendering similar to that of FIG. 4, by ignoring the z-axis dimension of movement. The reference points in FIG. 5 are designated by coordinates along each axis (i.e., the x-axis, the y-axis, and the z-axis), exemplifying a corresponding position in 3D space. Thus, the user may have starting pressing and holding the activation button when the nib of the smart wand device was at first position, corresponding to an origin with coordinates (0, 0, 0). Thereafter, while continuing to hold the activation button, the user moved the nib of the smart wand device to a second position (2, 6, 6), followed by a third position (4, 0, 6), fourth position (5, 0, 6), and fifth position (1, 3, 3), in that order. Once arriving at the fifth position (1, 3, 3), the user let go of the activation button then moved to a sixth position (6, 0, 6), where the user briefly pressed the activation button without further movement. After letting go of the activation button while still at the sixth position (6, 0, 6), the user moved the nib to a seventh position (8, 1, 6) and re-engaged the activation button. From the seventh position (8, 1, 6), the user continued to hold the activation button and moved in a 3D serpentine pattern to a ninth position (12, 5, 0), where the user once again let go of the activation button. Finally, after arriving at the ninth position (12, 5, 0), the user let go of the activation button then moved to a tenth position (13, 6, 0), where the user briefly pressed the activation button without further movement, then let go. In this way, by ignoring the z-axis component of the movement, the user will have made four separate gestures that form the letters "A" and "S," each followed by a period, similar to that shown in FIG. 4.

The processor of the smart wand device and/or the remote computing device may determine which dimension (i.e., axis) not to use for 2D rendering based on an orientation of the smart wand device. For example, if the smart wand device is being held such that a longitudinal axis (i.e., lengthwise) extends horizontally or substantially parallel to the ground, the processor may not use movements along a measured axis that is parallel to the ground, in a direction of that longitudinal axis of the smart wand device. Similarly, if the user is holding the smart wand device such that the longitudinal axis extends vertically or substantially perpendicular to the ground, the processor may not use movements along a measured axis that corresponds to the vertical axis. For angles in between the horizontally and vertically extending longitudinal axis, the processor may use a forty-five degree angle there between to decide which axis to not use for 2D rendering.

Figure 6:
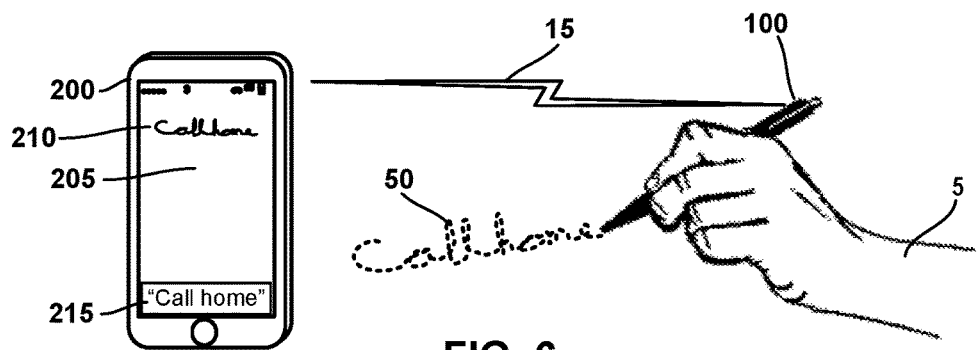
FIG. 6 is a schematic representation of a remote computing device generating a two-dimensional rendering of a gesture and converting the two-dimensional rendering into recognized text according to various embodiments.

FIG. 6 illustrates a remote computing device 200 generating a two-dimensional rendering 210 of a gesture 50 and converting the 2D rendering 210 into machine-encoded text 215 (i.e., recognized text), in accordance with various embodiments. Sensor data collected by the smart wand device 100 may be transmitted to the remote computing device 200 for interpretation. Once received by the remote computing device 200, the sensor data may be subsequently converted into a 2D rendering 210. In FIG. 6, dotted lines represent the movements forming the gesture 50, made in midair by the user 5 with the tip of the smart wand device 100. As shown, a path of the gesture 50 is similar to cursive writing forming letters and the words, "call home." However, gestures made with the smart wand device need not be limited to creating letters, words, sentences, etc. For example, the gestures may include drawn figures, shapes, diagrams, or almost anything a user can draw with the smart wand device 100. The two-dimensional rendering 210 of a display 205 on the remote computing device 200 may have a close resemblance to the gesture 50, in order to ensure it is an accurate representation of the gesture 50. In accordance with various embodiments, the processor of the remote computing device 200 may be configured with processor-executable instructions to perform character recognition on the 2D rendering 210. Character recognition is the electronic conversion of 2D renderings into machine-encoded text 215. After performing character recognition, the processor of the remote computing device 200 may store, display and/or otherwise use the machine-encoded text 215.

Figure 7:
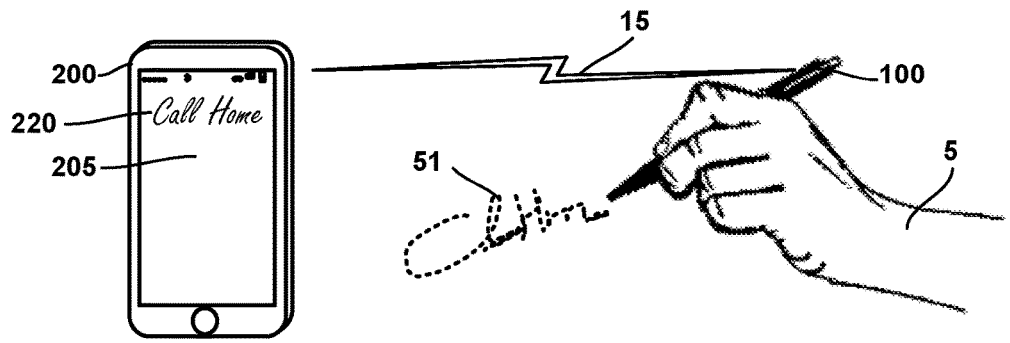
FIG. 7 is a schematic representation of a remote computing device generating a two-dimensional rendering of a shorthand gesture according to various embodiments.

FIG. 7 illustrates the remote computing device 200 converting a shorthand gesture 51 into a translated 2D rendering 220 of text that does not precisely resemble the shorthand gesture 51. Like the character recognition, described above with regard to FIG. 6, a processor of the smart wand device 100 and/or the remote computing device 200 may recognize certain gestures that translate to particular machine-encoded text and/or words. In addition, certain recognized gestures may translate to one or more operational commands for the remote computing device 200.

In accordance with various embodiments, the smart wand device may have a training mode. The training mode may help the user get used to making gestures with the smart wand device that may be recognized by a processor, such as in the smart wand device and/or the remote computing device. In addition, the training mode may allow the user to have particular gestures recorded in a memory and associated with, text, words, or operational commands. For example, while in training mode, a user may execute movements with the smart wand device (e.g., the shorthand gesture 51 in FIG. 7), which are stored in a memory. Thereafter, the user may use the remote computing device, a user interface, or other means of data entry to associate the particular text, words, or operational commands with the stored shorthand gesture.

Figure 8:
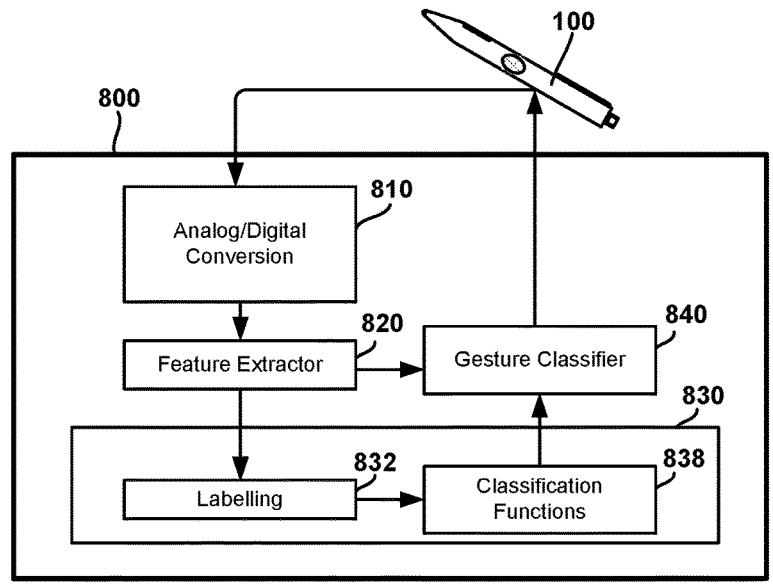
FIG. 8 is a schematic representation of a gesture analysis module according to various embodiments.

FIG. 8 illustrates functional modules for gesture recognition in a gesture analysis module 800, which may be included in the smart wand device 100 and/or the remote computing device (e.g., 200). An output from the one or more sensors (e.g., optical sensor 131 and/or motion sensor 134 in FIG. 2) may be an analog output. An analog/digital conversion module 810 may digitize such an analog output. The digitized signal may be broken down and analyzed by a gesture extraction module 820 in order to identify patterns or features of measured movements. Such patterns or features may be input to a gesture classifier module 840. In this way, certain gesture classifications may activate functions of the smart wand device 100 and/or the remote computing device, while other patterns or features need not be acted upon if considered noise. Additionally, a training module 830 may receive the identified patterns or features from the gesture extraction module 820. The training module 830 may include a labeling module 832 and a classification functions module 838 for informing the gesture classifier module 840 about the distinct gestures that need to be acted upon. The training module 830 may use a machine-learning algorithm, such as a K-means clustering or a supervised learning model, such as support vector machines (SVM). For example, using support vector machines the feature space may be the peak or average amplitude of the signals received from each sensor. An output of the training module 830 may be a set of decision functions that may be used to classify either real or test data into distinct gestures. A processor of the smart wand device 100 and/or the remote computing device may receive only appropriate classified gestures that may activate functions.

The processor of the smart wand device 100 and/or the remote computing device may provide more robust gesture recognition by including input from more than one gesture sensor in either real or test data. In addition, the processor may categorize the input from gesture sensors and use a gesture analysis module and/or inference engine to recognize gestures corresponding to particular movements by the user. Supervised machine learning algorithms may be employed for distinguishing the different movements from the potentially noisy signal data.

Figure 9:
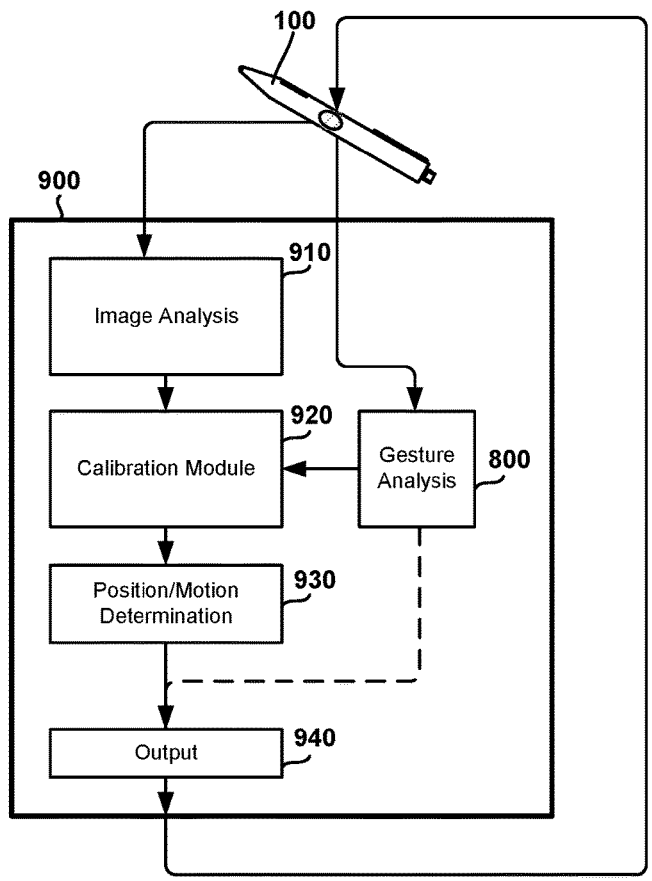
FIG. 9 is a schematic representation of an inference engine for enhanced input recognition according to various embodiments

FIG. 9 illustrates functional modules for enhanced input recognition in a smart wand device 100 and/or the remote computing device using an inference engine 900. The smart wand device 100 may capture images, such as from a nearby object, wall, or other surface. An inference engine 900 may analyze an output from the onboard orientation and/or position sensor. As part of the inference engine 900, an image analysis module 910 may receive and analyze the raw data and detect surface proximity. Also, the image analysis module 910 may detect objects, such as a chair, table, desk, etc., in the captured image. Based on the image analysis, a frame of reference may be determined and/or verified by a calibration module 920. With a frame of reference determined and/or verified, a position/motion determination module 930 may locate the smart wand device 100 relative to the frame of reference and/or track its movement. The location or movement of the smart wand device 100 may be translated, based on corresponding input values, to a 2D rendering or functional command by an output module 940, which may be acted upon by a processor of the smart wand device 100.

Additionally, redundant orientation and/or position sensors may be used in conjunction with a primary orientation and/or position sensor to calibrate and/or confirm position determinations made from captured images. In this way, the gesture analysis module 800 receiving input from the gesture sensor(s) may contribute its own output to the calibration module 920. For example, orientation and/or position sensors may detect a particular tilt of the smart wand device 100 relative to a nearby detected surface. Thus an algorithm, such as a Bayesian inference algorithm, may provide soft estimates of the altitude and/or azimuth angles created. Those soft estimates may then be compared in the calibration module 920 to determinations made from the image analysis. Alternatively, in response to the orientation and/or position sensor being turned off or in a stand-by mode, the gesture analysis module 800 may provide the output module 940 with an indication that a command should be output to turn on the orientation and/or position sensor(s).

Figure 10:
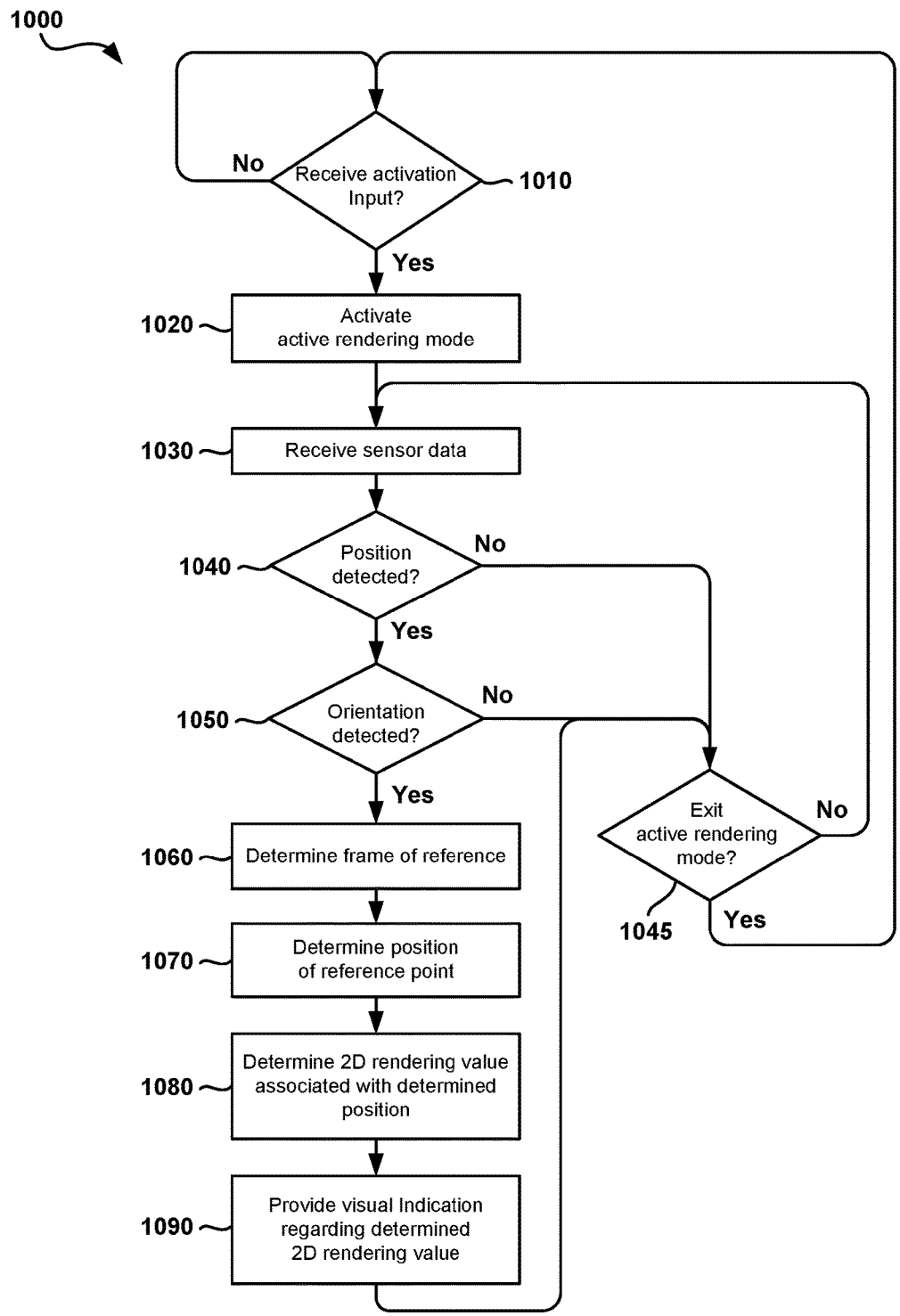
FIG. 10 is a process flow diagram illustrating a method of generating a two-dimensional rendering using a smart wand device according to various embodiments.

FIG. 10 illustrates an embodiment method 1000 of generating a two-dimensional rendering using a smart wand device, according to various embodiments. In determination block 1010, the processor may determine whether an activation input is received to activate (i.e., enter) the active rendering mode. Activation of the active rendering mode may automatically turn on the gesture sensors of the smart wand device. The activation input may be received automatically when the smart wand device is turned on. Alternatively, the gesture sensor(s) may remain off or dormant while the smart wand device is on and only activated by an activation input received from a control operated by the user (e.g., maintaining a finger or pressure on the activation button or maintaining the smart wand device in a particular orientation, such as horizontal) or some other trigger.

Considering the gesture sensor(s) may expend a significant amount of power, it may be desirable to provide one or more different ways of avoiding unintentionally enabling the orientation and/or position sensor and/or the active rendering mode functions. For example, redundant activation inputs or at least two different activation inputs may be required before enabling the active rendering mode.

In response to determining that an activation input is received (i.e., determination block 1010="Yes"), the active rendering mode may be activated in block 1020. In conjunction with the activation of the active rendering mode, it may be useful to provide a visual, audio and/or haptic (e.g., vibration) indication to the user that the active rendering mode has been and/or is activated. In response to determining that no activation input is received (i.e., determination block 1010="No"), the processor may await such an activation input before initiating the rest of the method 1000 or repeat the determination in determination block 1010.

With the active rendering mode active, sensor data may be received in block 1030. The received sensor data may represent one or more gestures measured by the gesture sensors, analyzed in series or in parallel by a processor of the smart wand device. Alternatively, the received sensor data may include more than one set of sensor data analyzed collectively in accordance with the subsequent blocks described below.

In determination block 1040, the processor may determine whether a position of a reference point (e.g., the tip) of the smart wand device is detected in the sensor data. In response to determining that no position is detected in the sensor data (i.e., determination block 1040="No"), the processor may determine whether to exit the active rendering mode in determination block 1045. In response to detecting a position of the reference point of the smart wand device in the sensor data (i.e., determination block 1040="Yes"), the processor may calibrate itself by orienting itself and determining a frame of reference. Thus, in response to determining that a position of the reference point of the smart wand device is detected in the sensor data (i.e., determination block 1040="Yes"), the processor may determine whether an orientation is detected in the sensor data or whether a reference orientation was previously established in determination block 1050. In response to determining that no orientation is detected in the sensor data and that no reference orientation was previously established (i.e., determination block 1050="No"), the processor may determine whether it is appropriate to exit the active rendering mode in determination block 1045.

The determination in determination block 1045 regarding whether to exit the active rendering mode may be based on an input received from the user, a particular software event, a timed trigger for conserving power in response to certain conditions (i.e., no activity, position, or orientation detected for a predetermined period of time) or other settings of the smart wand device. In response to determining that the active rendering mode should be exited (i.e., determination block 1045="Yes"), the processor may again determine whether an activation input is received in determination block 1010. In response to determining that the smart wand device should remain in the active rendering mode (i.e., determination block 1045="No"), the processor may receive further sensor data from the gesture sensor(s) in block 1030.

In response to detecting an orientation in the sensor data or that a reference input was previously established (i.e., determination block 1050="Yes"), the processor may determine a frame of reference in block 1060. Also, the processor may determine a position of the reference point of the smart wand device detected in the sensor data with respect to the determined frame of reference in block 1070. In block 1080, a 2D rendering value associated with the determined position may be determined. Thus, a visual indication regarding the determined 2D rendering value may be provided on a display of a remote computing device in block 1090 by applying the determinations from blocks 1060, 1070, 1080.

Figure 11:
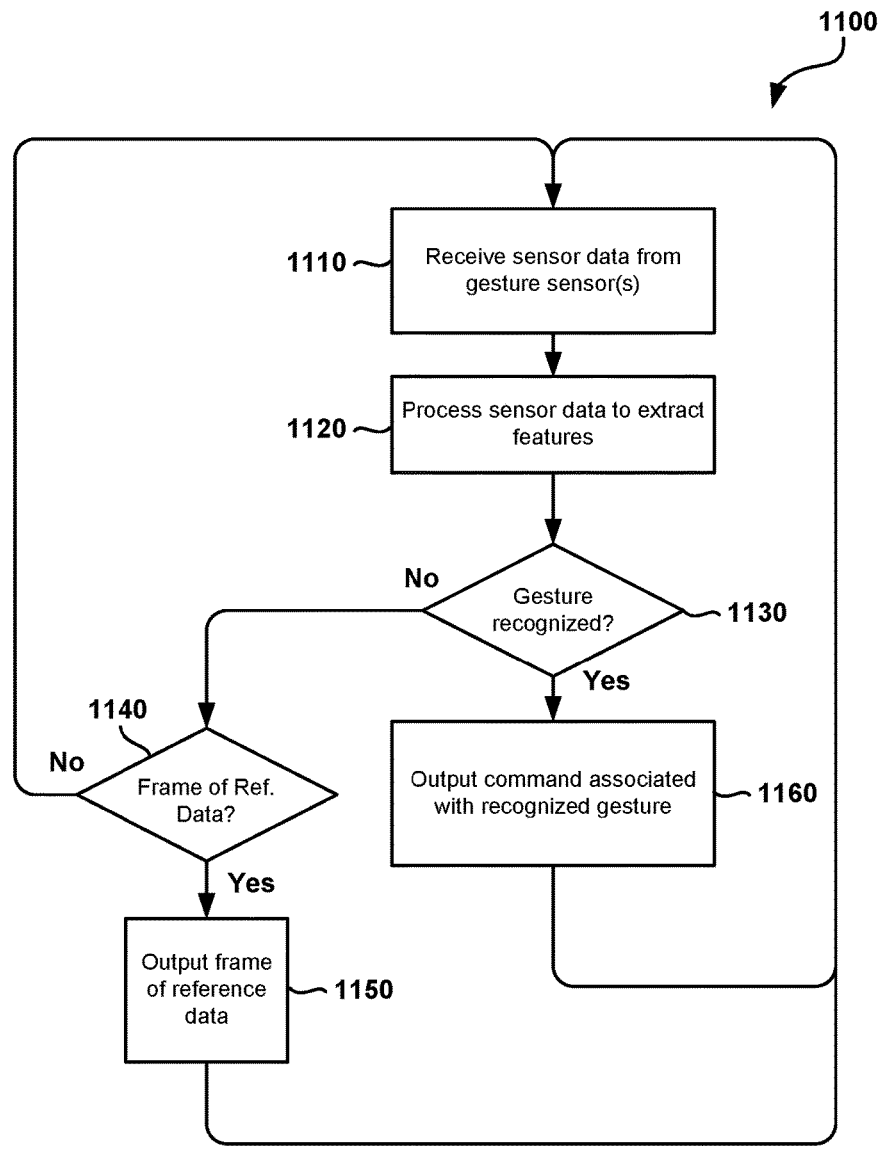
FIG. 11 is a process flow diagram illustrating a method of gesture recognition according to various embodiments.

FIG. 11 illustrates an embodiment method 1100 of gesture recognition that may be performed by a processor of the smart wand device and/or the remote computing device. In block 1110, sensor data may be received from one or more gesture sensors (e.g., an orientation sensor and/or a position sensor) directly or via the direct wireless link. The received sensor data may thus be processed in block 1120 to extract features. In determination block 1130, the processor may determine whether at least one gesture is recognized based on the extracted features.

In response to determining that no gesture is recognized from the extracted features (i.e., determination block 1130="No"), the processor may determine whether any frame of reference data may be derived from the extracted features in determination block 1140. In response to determining that no frame of reference data may be derived from the extracted features (i.e., determination block 1140="No"), the processor may await receipt of further input from the gesture sensor(s) in block 1110. In response to determining that frame of reference data may be derived from the extracted features (i.e., determination block 1140="Yes"), the processor may output such frame of reference data in block 1150. The output of such frame of reference data may include storing that data in a memory for use in future feature extractions (i.e., block 1120) and/or gesture recognition determinations (i.e., determination block 1130). When frame of reference data is output in block 1150, the processor may await receipt of further input from the gesture sensor in block 1110.

In response to determining that an extracted feature matches a recognized gesture (i.e., determination block 1130="Yes"), a command associated with the recognized gesture may be output in block 1160. For example, the recognized gesture may activate certain features of the smart wand device, the remote computing device, and/or trigger a particular 2D rendering in a display of a paired remote computing device. In particular, the recognized gesture may indicate the gesture sensor(s) should be activated. In which case, the sensor data received in block 1110 may be considered an activation input as described above with regard to determination block 1010 in FIG. 10. Additionally, in response to the recognized gesture indicating the gesture sensor(s) should be activated, the command output in block 1160 may be an active rendering mode activation command. When a command associated with the recognized gesture is output in block 1160, the processor may await receipt of further sensor data from the gesture sensor(s) in block 1110.

The various embodiments may include a smart wand device that includes an elongate barrel housing extending between a tip and an end cap, in which a portion of the elongate barrel housing is sized to be held by a user. The smart wand device may also include a position sensor secured to the elongate barrel housing and configured to determine changes in position of a reference point of the smart wand device, a transceiver, and a processor. The processor may be disposed within the elongate barrel housing and coupled to at least the position sensor and the transceiver. In some embodiments, the processor may be configured with processor-executable instructions to perform operations that include receiving sensor data from the position sensor and transmitting the sensor data to a remote computing device (e.g., to a mobile device vie a direct wireless link). The received sensor data may include measurements of movements or gestures made by the user, with the tip in midair, while the user holds the elongate barrel housing. The sensor data may identify a gesture made without contact between the tip and a surface. The transmitted sensor data may include information suitable for cause the receiving device (e.g., remote computing device) to perform various operations, such as operations for convert sensor data into a two-dimensional rendering that corresponds to a gesture made with the tip in midair.

In some embodiments, the smart wand device may include a fingerprint scanner disposed on the portion of the elongate barrel housing sized to be held by the user. The fingerprint scanner may be coupled to the processor and configured to detect fingerprint features of the user in response to the user engaging a finger on the fingerprint scanner while the user is holding the elongate barrel housing. In some embodiments, the smart wand device processor may be configured to receive data representing the fingerprint features, and transmit the data representing the fingerprint features, using the transceiver, to the remote computing device. In some embodiments, the smart wand device processor may be configured to receive an indication from the remote computing device that the data representing the fingerprint features was accepted for unlocking the remote computing device.

In some embodiments, the reference point may include information that corresponds to a nib of the smart wand device. In some embodiments, the smart wand device of may include an orientation sensor that is secured to the elongate barrel housing and configured to determine changes in an orientation of the elongate barrel housing.

Figure 12:
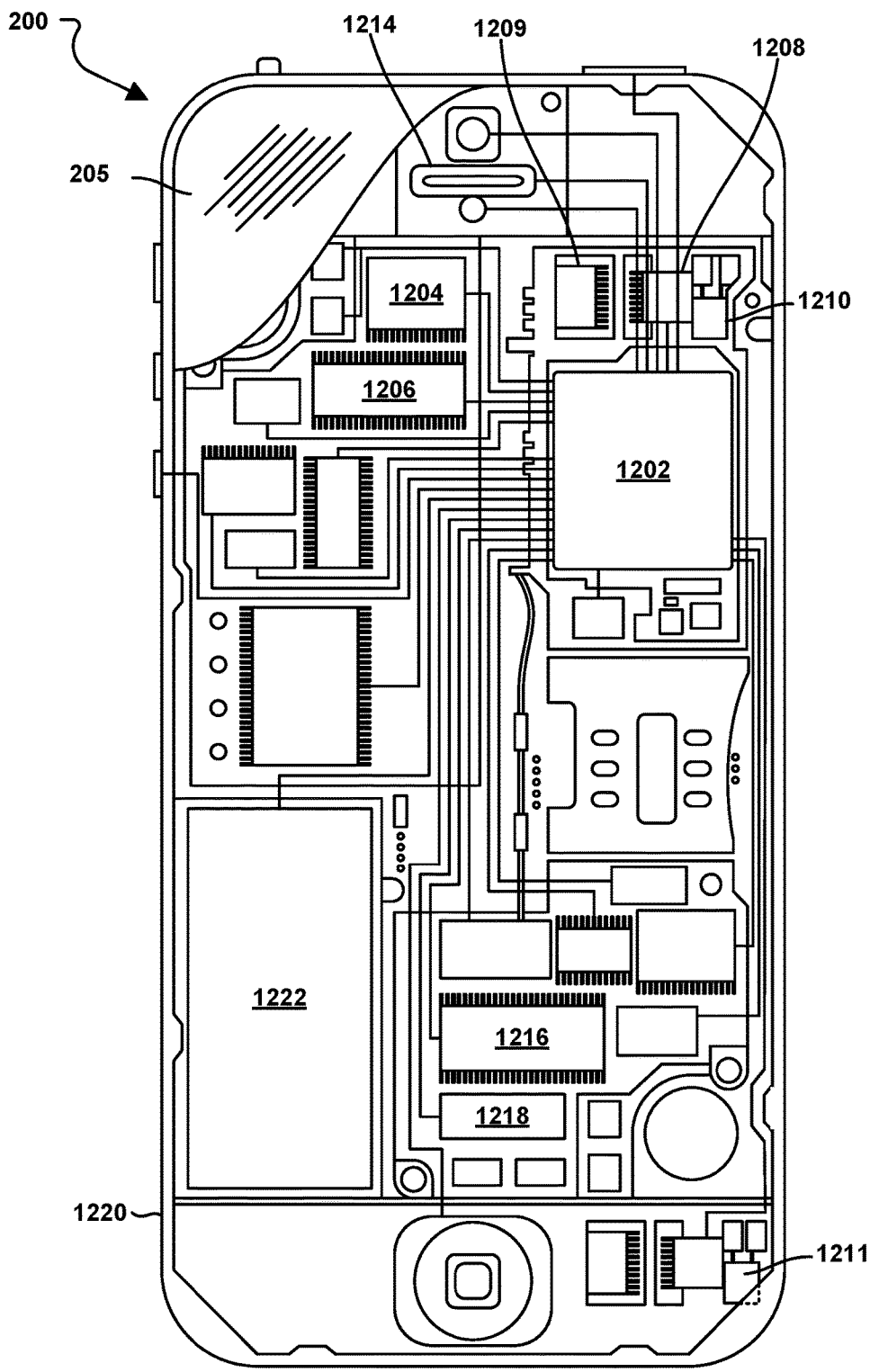
FIG. 12 is a component diagram of an example remote computing device according to various embodiments.

Various embodiments may be implemented in any of a variety of remote computing devices, an example of which is illustrated in FIG. 12. For example, the remote computing device 200 may include a processor 1202 coupled to a touch screen controller 1204 and an internal memory 1206. The processor 1202 may be one or more multicore ICs designated for general or specific processing tasks. The internal memory 1206 may be volatile or non-volatile memory, and may be secure and/or encrypted memory, or unsecure and/or unencrypted memory, or any combination thereof.

The touch screen controller 1204 and the processor 1202 may also be coupled to a touch screen panel of the display 205, such as a resistive-sensing touch screen, capacitive-sensing touch screen, infrared sensing touch screen, etc. The processor 1202 may be coupled to two or more radio signal transceivers 1208, 1209 and antennas 1210, 1211 that enable communications via two or more cellular networks for sending and receiving voice and data calls. The transceivers 1208, 1209 and antennas 1210, 1211 may be used with the above-mentioned circuitry to implement the various wireless transmission modem stacks and interfaces.

The remote computing device 200 may include a peripheral device connection interface 1218 coupled to the processor 1202. The peripheral device connection interface 1218 may be singularly configured to accept one type of connection, or multiply configured to accept various types of physical and communication connections, common or proprietary, such as USB, FireWire, Thunderbolt, or PCIe. The peripheral device connection interface 1218 may also be coupled to a similarly configured peripheral device connection port (not shown). The peripheral device connection interface 1218 may be used to provide a wired connection between the remote computing device 200 and the smart wand device. The remote computing device 200 may also include speakers 1214 for providing audio outputs. The remote computing device 200 may also include a housing 1220, constructed of a plastic, metal, or a combination of materials, for containing all or some of the components discussed herein. The remote computing device 200 may include a power source 1222 coupled to the processor 1202, such as a disposable or rechargeable battery. The rechargeable battery may also be coupled to the peripheral device connection port to receive a charging current from a source external to the remote computing device 200.

The processors 150, 1202 in FIGS. 2 and 12 respectively, may be any programmable microprocessor, microcomputer or multiple processor chip or chips that can be configured by software instructions (applications) to perform a variety of functions, including the functions of various embodiments described above. In some devices, multiple processors may be provided, such as one processor dedicated to wireless communication functions and one processor dedicated to running other applications. Typically, software applications may be stored in the internal memory 152, 1206 (referring again to FIGS. 2 and 12 respectively) before they are accessed and loaded into the processors 150, 1202. Processors 150, 1202 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 150, 1202 including internal memory or removable memory plugged into the remote computing device and memory within the processor 150, 1202, themselves.

As used in this application, the phrase "direct wireless link" refers to any short-range direct wireless data communication connection between two computing devices or within a personal area network. Unlike a cellular telephone call, a direct wireless link does not include an intermediary wide area network (WAN) access point. For example, a direct wireless link may use Bluetooth or Wi-Fi standards/protocols to link directly two mobile communication devices.

The term "computing device" is used generically in this application to refer to any one or all of servers, personal computers, laptop computers, tablet computers, mobile devices, cellular telephones, smartbooks, ultrabooks, palmtop computers, personal data assistants (PDA's), wireless electronic mail receivers, multimedia Internet enabled cellular telephones, Global Positioning System (GPS) receivers, wireless gaming controllers, and other similar electronic devices that include a programmable processor and circuitry for wirelessly sending or receiving information.

The terms "mobile device," "wireless mobile device" and "mobile computing device" may be used interchangeably in this application, and refer to any one or all of cellular telephones, smartphones, personal or mobile multimedia players, watches, wrist displays, medical devices, headsets, headphones, speakers, microphones, and/or any electronic device that includes circuitry for wirelessly sending and/or receiving information.

Terms "component," "module," "system," "engine," "generator," "manager" and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The term "Bluetooth®-enabled device" may be used in this application to refer to any electronic device that includes a radio frequency (RF) radio and a processor or circuitry for implementing the Bluetooth® protocol stack/interface. Bluetooth® is an open standard for short-range radio frequency (RF) communications. Details of the Bluetooth® standards, interfaces, and technology are set forth in Bluetooth® Special Interest Group (SIG) Specification of the Bluetooth® System Core Version 5.0 Dec. 6, 2016, which is herein incorporated by reference in its entirety.

Bluetooth® technology provides a secure way to connect and exchange information between electronic devices (e.g., headphones, cellular phones, watches, laptops, remote controls, etc.). Bluetooth® requires that devices first establish a "trust relationship" before they are allowed to connect to one another. This is because many of the services offered over Bluetooth® can expose private data or allow the connecting party to control the connected device. A trust relationship may be established using a process called "pairing" in which a bond formed between the two devices. This bond enables the devices to communicate with each other in the future without further authentication.

The pairing process may be triggered by a specific request to create a bond (e.g., user explicitly requests to "add a Bluetooth® device"), or may be triggered automatically (e.g., when connecting to a service). A Bluetooth® device may automatically initiate the performance of the pairing operations each time the device is powered or moved within a certain distance of another Bluetooth® device. Pairing information relating to current and previously established pairings may be stored in a paired device list (PDL) in the memory of the Bluetooth® device. This pairing information may include a name field, an address field, a link key field, and other similar fields (e.g., profile type, etc.) useful for authenticating the device and/or establishing a Bluetooth® communications link.

Bluetooth® communications may require establishing wireless personal area networks (also referred to as "ad hoc" or "peer-to-peer" networks). These ad hoc networks are commonly called "piconets." Each device may belong to multiple piconets. Multiple interconnected piconets may be called scatternets. A scatternet may be formed when a member of a first piconet elects to participate in a second piconet.

Any electronic device that includes a radio frequency (RF) radio and/or circuitry implementing a short wave wireless protocol/interface is a wireless-enabled device capable of communicating using short wave wireless technology. Such RF radios and circuitry are may be embedded in small electronic devices (e.g., smart wand devices, etc.), allowing these devices to communicate using wireless technology and replacing the need for wires or wire based communications.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module or component that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A smart wand device, comprising: an elongate barrel housing having a longitudinal axis extending between a tip and an end cap, wherein a portion of the elongate barrel housing is sized to be held by a user; a position sensor secured to the elongate barrel housing and configured to determine changes in position of a reference point of the smart wand device;

an activation button positioned midway along the elongate barrel housing such that, while the user is holding the elongate barrel housing between two fingers in a writing position with a select hand, a finger on that hand is readily received on the activation button, wherein the activation button is configured to detect fingerprint features of the user in response to the user engaging the finger on the activation button while the user is holding the elongate barrel housing between the two fingers in the writing position;

a transceiver; and a processor disposed within the elongate barrel housing and coupled to at least the position sensor, the activation button, and the transceiver, wherein the processor is configured with processor-executable instructions to perform operations comprising:

receiving data representing the detected fingerprint features from the activation button;

transmitting the data representing the detected fingerprint features to a remote computing device that is in close physical proximity to the smart wand device; receiving an indication from the remote computing device that the data representing the detected fingerprint features was accepted for unlocking the remote computing device;

receiving sensor data from the position sensor, wherein the sensor data measures movements of a gesture made with the tip in midair by the user holding the elongate barrel housing, wherein the gesture is made without contact between the tip and a surface;

determining an orientation of the smart wand device, the determined orientation including a horizontally extending longitudinal axis that extends parallel to the ground and a vertically extending longitudinal axis that extents perpendicular to the ground; using a forty-five degree angle between the horizontally extending longitudinal axis and the vertically extending longitudinal axis to determine the sensor data to not be used for a two-dimensional rendering corresponding to the gesture made with the tip in midair by the user; and transmitting the sensor data, using the transceiver, to the remote computing device for conversion into the two-dimensional rendering.

2. The smart wand device of claim 1, wherein the reference point corresponds to a nib of the smart wand device.

3. The smart wand device of claim 1, further comprising: an orientation sensor secured to the elongate barrel housing and configured to determine changes in an orientation of the elongate barrel housing.

4. A method of unlocking and controlling a remote computing device that is in close physical proximity to a smart wand device held in a hand of a user, comprising:
receiving, via a processor of the smart wand device, data representing detected fingerprint features from an activation button of the smart wand device, wherein: the activation button is positioned midway along an elongate barrel housing of the smart wand device such that, while the user is holding the elongate barrel housing between two fingers in a writing position with a select hand, a finger on that hand is readily received on the activation button, the activation button is configured to detect fingerprint features of the user in response to the user engaging the finger on the activation button while the user is holding the elongate barrel housing between the two fingers in the writing position, the elongate barrel housing has a longitudinal axis that extends between a tip and an end cap, and
a position sensor secured to the elongate barrel housing and configured to determine changes in position of a reference point of the smart wand device; transmitting, via the processor, the data representing the detected fingerprint features to the remote computing device that is in close physical proximity to the smart wand device;
receiving, via the processor, an indication from the remote computing device that the data representing the detected fingerprint features was accepted for unlocking the remote computing device;
receiving, via the processor, sensor data from the position sensor, wherein the sensor data measures a gesture made with the tip in midair by the user holding the elongate barrel housing, wherein the gesture is made without contact between the tip and a surface;
determining, via the processor, an orientation of the smart wand device, the determined orientation including a horizontally extending longitudinal axis that extends parallel to the ground and a vertically extending longitudinal axis that extents perpendicular to the ground; using, via the processor, a forty-five degree angle between the horizontally extending longitudinal axis and the vertically extending longitudinal axis to determine the sensor data to not be used for a two-dimensional rendering corresponding to the gesture made with the tip in midair by the user;
and transmitting, via the processor, the sensor data to the remote computing device for generating the two-dimensional rendering.

5. The method of claim 4, wherein the two-dimensional rendering includes at least one drawn line or mark that matches a pattern of the gesture.

6. The method of claim 4, wherein the gesture includes shorthand used for generating the two-dimensional rendering.

7. The method of claim 4, wherein the two-dimensional rendering includes at least one alphanumeric character.

8. The method of claim 4, wherein generating the two-dimensional rendering uses a previous training sequence that correlates the gesture to the two-dimensional rendering.

9. The method of claim 4, further comprising:
converting the sensor data to rendering data configured to generate a visual representation of the gesture made with the smart wand device on a display of the remote computing device, wherein the sensor data transmitted to the remote computing device includes the rendering data converted from the sensor data.

10. The method of claim 4, wherein reception by the remote computing device of the data representing the detected fingerprint features does not require line-of-sight between the smart wand device and the remote computing device.

11. The method of claim 4, further comprising transmitting an authorization input that includes a sequence of button presses with a particular timing sequence that acts as an authentication code for unlocking the remote computing device from the locked state.

12. The method of claim 4, further comprising:
receiving an application launch input corresponding to the user contacting an application launch button on the smart wand device; and
transmitting an application activation message to the remote computing device in response to receiving the application launch input, wherein the application activation message acts to activate an application on the remote computing device.

13. The method of claim 12, wherein the application activated by the application activation message receives:
an audio input from a microphone of the remote computing device; and
a video input from a camera of the remote computing device.

14. A non-transitory computer readable storage medium having stored thereon processor-executable software instructions configured to cause a processor of a smart wand device to perform operations comprising:
receiving data representing detected fingerprint features from an activation button of the smart wand device, wherein: the activation button is positioned midway along an elongate barrel housing of the smart wand device such that, while a user is holding the elongate barrel housing between two fingers in a writing position with a select hand, a finger on that hand is readily received on the activation button, the activation button is configured to detect fingerprint features of the user in response to the user engaging the finger on the activation button while the user is holding the elongate barrel housing between the two fingers in the writing position, the elongate barrel housing has a longitudinal axis that extends between a tip and an end cap, and a position sensor secured to the elongate barrel housing and configured to determine changes in position of a reference point of the smart wand device; transmitting the data representing the detected fingerprint features to a remote computing device that is in close physical proximity to the smart wand device; receiving an indication from the remote computing device that the data representing the detected fingerprint features was accepted for unlocking the remote computing device, receiving sensor data from the position sensor, wherein the sensor data measures a gesture made with the tip in midair by the user holding the elongate barrel housing, wherein the gesture is made without contact between the tip and a surface;

determining, via the processor, an orientation of the smart wand device, the determined orientation including a horizontally extending longitudinal axis that extends parallel to the ground and a vertically extending longitudinal axis that extents perpendicular to the ground;

using, via the processor, a forty-five degree angle between the horizontally extending longitudinal axis and the vertically extending longitudinal axis to determine the sensor data to not be used for a two-dimensional rendering corresponding to the gesture made with the tip in midair by the user;

and transmitting the sensor data to the remote computing device for generating the two-dimensional rendering.

* * * * *